United States Patent [19]

Dehnert et al.

[11] Patent Number: 4,599,402

[45] Date of Patent: Jul. 8, 1986

[54] METAL COMPLEX DYES CONTAINING AZO AZOMETHINE GROUPS

[75] Inventors: Johannes Dehnert, Ludwigshafen; Werner Jünemann, Bad Dürkheim, both of Fed. Rep. of Germany

[73] Assignee: BASF Aktiengesellschaft, Ludwigshafen, Fed. Rep. of Germany

[21] Appl. No.: 660,124

[22] Filed: Oct. 12, 1984

[30] Foreign Application Priority Data

Oct. 15, 1983 [DE] Fed. Rep. of Germany ....... 3337591

[51] Int. Cl.$^4$ ................ C09B 45/04; C09B 45/22; C09B 45/18; C09B 45/30
[52] U.S. Cl. ................ 534/700; 534/695; 534/701; 534/704; 534/709; 534/710; 534/718; 534/738; 534/777; 534/792; 534/794; 534/851; 564/251
[58] Field of Search ............ 534/695, 704, 709, 710, 534/738, 700, 701, 718, 777, 792; 260/149

[56] References Cited

U.S. PATENT DOCUMENTS

| | | | |
|---|---|---|---|
| 2,726,238 | 12/1955 | Morschel et al. | 534/738 X |
| 3,389,132 | 6/1968 | Dressler et al. | 534/738 X |
| 3,878,188 | 4/1975 | L'Eplattenier et al. | 534/704 |
| 3,971,739 | 7/1976 | McCrae et al. | 534/710 X |
| 3,987,023 | 10/1976 | McCrae et al. | 534/738 X |
| 4,012,193 | 3/1977 | Botros | 534/738 X |
| 4,077,953 | 3/1978 | McCrae et al. | 534/710 X |
| 4,359,515 | 11/1982 | Katagiri et al. | 534/738 X |
| 4,424,153 | 1/1984 | Baumann et al. | 534/738 X |

FOREIGN PATENT DOCUMENTS

| | | | |
|---|---|---|---|
| 2533958 | 2/1977 | Fed. Rep. of Germany | 534/700 |
| 0910618 | 8/1978 | U.S.S.R. | 260/147 |
| 0910619 | 8/1978 | U.S.S.R. | 260/147 |
| 0910620 | 8/1978 | U.S.S.R. | 260/147 |

Primary Examiner—Floyd D. Higel
Attorney, Agent, or Firm—Oblon, Fisher, Spivak, McClelland & Maier

[57] ABSTRACT

The novel compounds of the general formula I

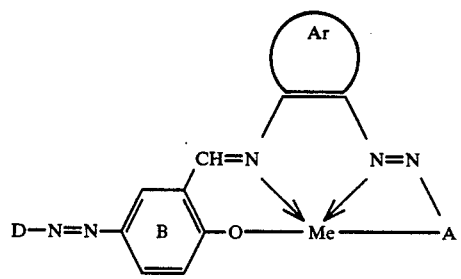

where A is a radical of a coupling or diazo component which, if necessary after conversion, is capable of complex formation, Ar is an unsubstituted or substituted aromatic or heterocyclic radical, D is a radical of a diazo component and Me is a $Co^{2+}$, $Cu^{2+}$, $Zn^{2+}$, $Mn^{2+}$ or $Ni^{2+}$ ion, and the ring B can be further substituted, are very useful for dyeing cellulose fibers, polyesters and blends of cellulose fibers and polyesters.

The present dyes are lightfast and fast to washing and to solvents.

7 Claims, No Drawings

METAL COMPLEX DYES CONTAINING AZO AZOMETHINE GROUPS

BACKGROUND OF THE INVENTION

Field of the Invention

The present invention relates to compounds of the general formula I

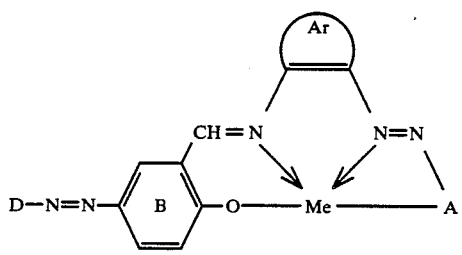

(I)

where A is a radical of a coupling or diazo component which, if necessary after conversion, is capable of complex formation, Ar is an unsubstituted or substituted aromatic or heterocyclic radical, D is a radical of a diazo component and Me is a $Co^{2+}$, $Cu^{2+}$, $Zn^{2+}$, $Mn^{2+}$ or $Ni^{2+}$ ion and the ring B can be further substituted.

DESCRIPTION OF THE PREFERRED EMBODIMENTS OF THE INVENTION

A is, for example, a radical of the formula

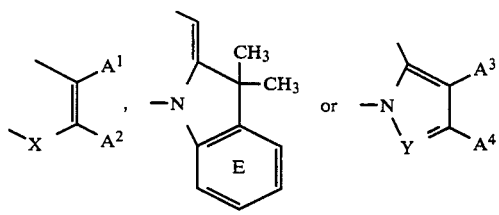

where $A^1$ is alkanoyl, unsubstituted or substituted benzoyl or unsubstituted or substituted alkyl- or arylaminocarbonyl, $A^2$ is alkyl or aryl, or $A^1$ and $A^2$ together form a radical of an unsubstituted or substituted aliphatic, aromatic or heterocyclic ring system, $A^3$ is hydrogen or alkyl, $A^4$ is hydrogen or alkoxycarbonyl, alkyl or aryl, or $A^3$ and $A^4$ together form tetramethylene or complete an unsubstituted or substituted benzo ring, X is —O— or

Y is —N= or

the ring E can be further substituted by chlorine, and $A^5$ is hydrogen, methyl, ethyl, propyl, butyl, $\beta$-methoxyethyl, $\gamma$-methoxypropyl or benzyl.

Specific examples of radicals $A^1$ are $CH_3$—CO—, $C_2H_5$—CO—, $C_6H_5$—CO—, p—$CH_3$—$C_6H_4$—CO—, p—Cl—$C_6H_4$—CO—, —CO—N—$(C_2H_5)_2$, —CO—NH—$C_6H_5$,

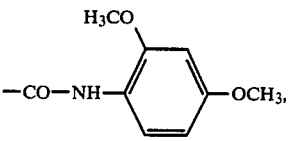

—CO—NH—$\alpha$—$C_{10}H_7$, —CO—NH$\beta$—$C_{10}H_7$, —CO—NH—$C_6H_4$—o—$OCH_3$ and —CO—NH—$C_6H_4$—o—$CH_3$.

Specific examples of $A^2$ are $CH_3$, $C_2H_5$ and $C_6H_5$

The radicals of a ring system which are formed from $A^1$ and $A^2$ are, for example, of the formulae:

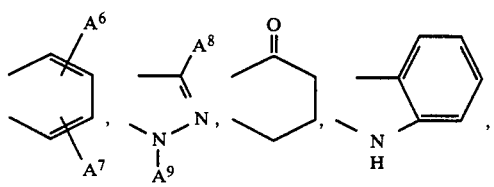

where $A^5$ has the above meanings, $A^6$ is hydrogen, alkyl, chlorine, bromine, nitro or unsubstituted or substituted phenylazo, $A^7$ is hydrogen, chlorine or methyl, or $A^6$ and $A^7$ together complete a benzo ring, $A^8$ is hydrogen, methyl, phenyl or $C_1$-$C_4$-alkoxycarbonyl and $A^9$ is hydrogen or unsubstituted or substituted alkyl, cycloalkyl, aralkyl, heteroaralkyl or aryl.

Examples of alkyl radicals $A^3$ are methyl and ethyl.

Specific examples of radicals $A^4$ in addition to hydrogen are $CO_2CH_3$, $CO_2C_2H_5$, $CO_2C_3H_7$, $CO_2C_4H_9$, $CH_3$, $C_2H_5$, $C_6H_5$ and $C_6H_4Cl$.

The benzo rings formed from $A^3$ and $A^4$ together can be substituted by, for example, Cl or $NO_2$.

Specific examples of radicals $A^6$ in addition to those stated above are methyl and ethyl, and phenylazo which is unsubstituted or substituted by chlorine, bromine, methyl, methoxy, nitro or cyano.

Examples of $A^9$ in addition to hydrogen are $CH_3$, $C_2H_5$, n—$C_3H_7$, i—$C_3H_7$, n—$C_4H_9$, i—$C_4H_9$, $C_2H_4OCH_3$, $C_2H_4OC_6H_5$, $C_6H_{11}$, $CH_2$—$C_6H_5$,

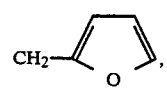

—$C_6H_5$, $C_6H_4CH_3$, $C_6H_4C_2H_5$, $C_6H_4Cl$, $C_6H_3Cl_2$, $C_6H_4NO_2$, $C_6H_3ClNO_2$, $C_6H_3ClCH_3$ and $C_6H_4Br$.

The radicals Ar are of, for example, the formulae

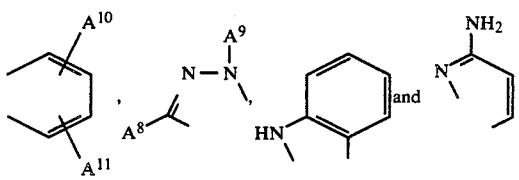

where $A^{10}$ is hydrogen, chlorine, bromine, alkyl, alkoxy, aralkoxy, aryloxy or unsubstituted or substituted phenylazo or amino, $A^{11}$ is hydrogen, methyl, methoxy or chlorine, or $A^{10}$ and $A^{11}$ together complete a benzo ring, and $A^8$ and $A^9$ have the stated meanings.

Specific examples of radicals $A^{10}$ in addition to those stated above are $CH_3$, $C_2H_5$, $OCH_3$, $OC_2H_5$, $OC_2H_4OCH_3$, $O-n-C_4H_9$, $OC_6H_5$, $OCH_2C_6H_5$, $OC_2H_4OC_6H_5$, $NHCH_3$, $NHC_2H_5$, $NHC_4H_9$, $N(CH_3)_2$, $N(C_2H_5)_2$, $N(C_3H_7)_2$, $N(C_4H_9)_2$,

$NHCOCH_3$,

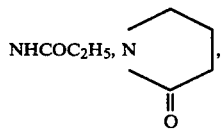

$NHCOC_2H_5$, $N(CH_3)C_2H_4CN$, $N(C_2H_5)C_2H_4CN$, $-N=N-C_6H_5$, $N=N-C_6H_4-o-OCH_3$, $-N=N-C_6H_4-o-Cl$ and $N(CH_2CH=CH_2)C_2H_4CN$.

The radicals D of the diazo components are preferably derived from the aniline series and can be substituted by, for example, fluorine, chlorine, bromine, $C_1-C_4$-alkyl, $C_1-C_4$-alkoxy, phenoxy, benzyloxy, phenoxyethoxy, cyano, nitro, $C_1-C_4$-alkylsulfonyl, acetyl, propionyl, pyrrolidonyl, carboxylic acid ester, unsubstituted or substituted carbamyl or sulfamyl, trifluoromethyl or unsubstituted or substituted arylazo.

Specific examples of substituents in addition to those stated above are $CH_3$, $C_2H_5$, $C(CH_3)_3$, $n-C_4H_9$, $CH(CH_3)_2$, $OCH_3$, $OC_2H_5$, $O-n-C_4H_9$, $-SO_2CH_3$, $SO_2C_2H_5$, $-SO_2C_4H_9$, $CO_2C_2H_5$, $CONH_2$, $CON(CH_3)_2$, $CON(C_2H_5)_2$, $CON[C_4H_9-n]_2$, $CONHCH_2CH(C_2H_5)C_4H_9$, $CO_2CH_3$, $CO_2C_{10}H_{21}$, $SO_2-N(CH_3)_2$, $SO_2N(C_2H_5)_2$, $-N=N-C_6H_5$ and $-CO-NHC_3H_6OC_2H_4OC_6H_5$.

Arylazo is, for example, phenylazo which is substituted by $CH_3$, $C_2H_5$, $Cl$, $Br$, $OCH_3$, $OC_2H_5$, $OC_4H_9$, $NO_2$, $CN$, phenoxy or pyrrolidonyl.

The ring B in formula I can be further substituted by, for example, methyl, ethyl, propyl, butyl, methoxy, ethoxy, chlorine or bromine.

The compounds of the formula I are prepared by conventional methods. Typical data for various types of complexes are given in the examples, in which parts and percentages are by weight, unless stated otherwise.

The compounds of the formula I are particularly useful for dyeing cellulose fibers and polyesters or blends of the two, for example by the methods described in DE-C-1 811 796 and DE-A-2 524 243 and DE-A-2 528 743. As a rule, the dyeings obtained possess very good fastness properties.

Particularly useful dyes are those of the formula Ia

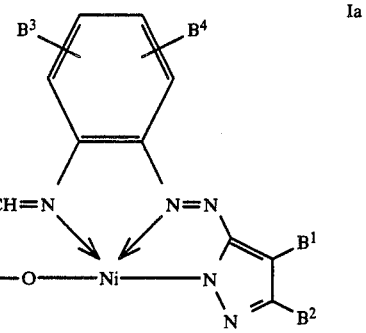

where $B^1$ is hydrogen, methyl or phenyl, $B^1$ and $B^2$ together complete a benzo ring, $B^3$ is methyl, alkoxy or benzyloxy, $B^4$ is hydrogen, methyl, chlorine or methoxy and $D^1$ is phenyl which is unsubstituted or substituted by chlorine, bromine, alkyl, unsubstituted or substituted alkoxy or unsubstituted or substituted phenylazo.

The phenylazo radicals can be substituted by $CH_3$, $C_2H_5$, $Cl$, $Br$, $OCH_3$, $OC_2H_5$ or

Examples of substituted alkoxy radicals are ethoxy which is substituted by $C_1-C_4$-alkoxy or by phenoxy, ie. $CH_3OC_2H_4O-$, $C_2H_5OC_2H_4O-$, $C_4H_9OC_2H_4O-$ and $C_6H_5OC_2H_4O-$.

Other useful dyes are those of the formula Ib

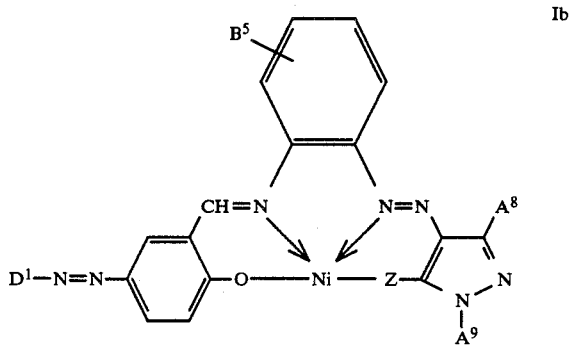

where $B^5$ is hydrogen, methyl, ethyl, methoxy, ethoxy, phenoxy, acetylamino or chlorine, Z is $-O-$ or $-NH-$, and $D^1$, $A^8$ and $A^9$ have the stated meanings.

In this formula, $A^8$ is preferably hydrogen or methyl, and $A^9$ is preferably H, $CH_3$, $C_2H_5$, $n-C_3H_7$, $i-C_3H_7$, $CH_2-CH(CH_3)_2$, $CH_2C_6H_5$,

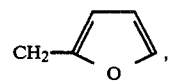

$C_6H_{11}$, $C_6H_5$, $C_6H_4CH_3$, $C_6H_4-C_2H_5$ or $C_6H_4Cl$.

Other preferred compounds are those of the formula Ic

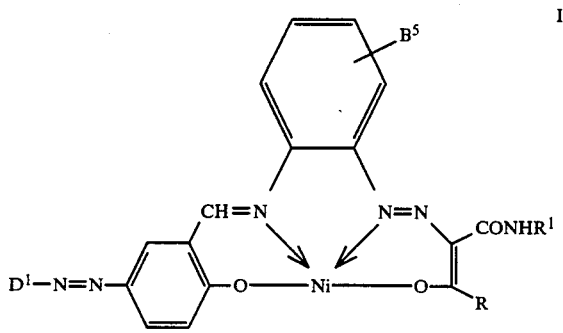

where R is methyl or phenyl, $R^1$ is naphthyl or phenyl which is unsubstituted or substituted by $CH_3$, $C_2H_5$, $OCH_3$, $OC_2H_5$ or Cl, and $B^5$ and $D^1$ have the stated meanings.

EXAMPLES

Intermediate No. 1

68.6 parts of p-[β-phenoxyethoxy]-aniline are dissolved in a hot mixture of 2,500 parts of water and 250 parts by volume of concentrated hydrochloric acid, 1,500 parts of ice are added, and diazotization is then carried out with 100 parts by volume of 23% strength $NaNO_2$ solution in the course of 2 hours. The excess nitrite is destroyed in the usual manner, and the diazo solution is then run into a stirred mixture of 36.8 parts of salicylaldehyde, 2,000 parts of water, 200 parts of sodium carbonate and 1,000 parts by volume of N-methyl-pyrrolid-2-one, at 0°–5° C. When coupling is complete, the mixture is brought to pH 4 with glacial acetic acid, and the precipitate is filtered off under suction, washed with water and then dried to give 92 parts of the aldehyde component of the formula

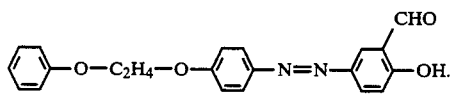

Intermediate No. 2

810 parts of a 12.5% strength aqueous paste of the product obtained when diazotized o-nitroaniline is coupled to acetoacetic acid α-naphthylamide are reduced at 90° C. in a mixture of 600 parts by volume of ethanol and 300 parts by volume of diethylene glycol, by the dropwise addition of a solution of 44 parts of NaSH in 140 parts of water. When the reaction is complete (which takes about 1 hour), the mixture is cooled to room temperature, and the precipitate is filtered off under suction, washed with water and dried to give 54 parts of the o-aminophenylhydrazone of the formula

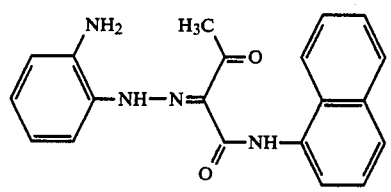

Intermediate No. 3

A solution of 88 parts of NaSH in 280 parts of water is added dropwise, in the course of 2 hours, to a boiling mixture of 1,000 parts by volume of ethanol, 200 parts of water and 160 parts of the product obtained when diazotized o-nitroaniline is coupled to 3-methyl-1-phenyl-pyrazol-5-one. When the reaction has continued for a further hour, the mixture is cooled, and the product is filtered off under suction, washed with water and dried to give 68 parts of the compound of the formula

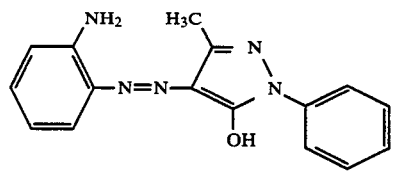

or of a tautomer.

EXAMPLE 1

A solution of 5 parts of nickel(II) acetate tetrahydrate in 12 parts of water is added to a boiling mixture of 250 parts by volume of acetic acid, 7.2 parts of the aldehyde component (Intermediate No. 1) and 6.92 parts of the o-aminophenylhydrazone (Intermediate No. 2). The mixture is refluxed for 1 hour, after which it is cooled, the product is precipitated with 150 parts of water, and the precipitate is filtered off under suction, washed with methanol and then with water and dried to give 13 parts of a very lightfast golden yellow dye of the formula

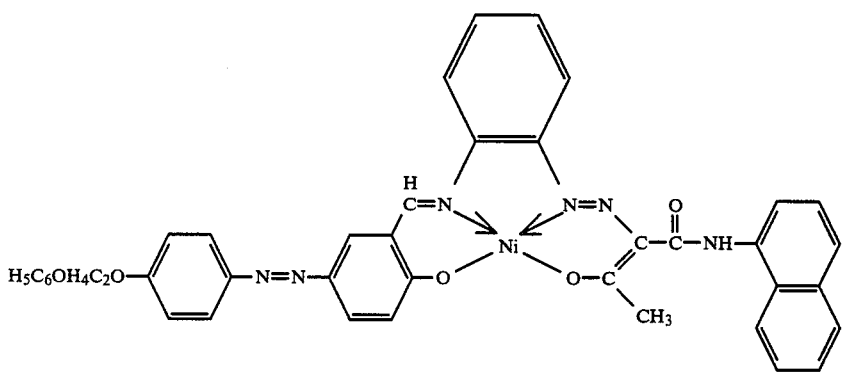

A polyester/cotton blend is printed with a formulation which consists of 10 parts of the above dye, 100 parts of the product obtained by reacting polyethylene oxide having a molecular weight of 300 with boric acid in a molar ratio of 3:1, 30 parts by oleic acid diethanolamide and 860 parts of a 3% strength alginate thickener, and the print is dried at 110° C., treated for 5 minutes with superheated steam at 185° C., rinsed with cold water and washed at 100° C. with a commercial detergent. The resulting golden yellow print on a white ground is light-fast and fast to washing and to solvents.

EXAMPLE 2

A stirred mixture of 7.24 parts of Intermediate No. 1, 5.86 parts of Intermediate 3 and 5 parts of nickel(II) acetate tetrahydrate in 400 parts of glacial acetic acid is refluxed for 1 hour, after which the precipitate is filtered off under suction at 30° C., washed with methanol and water and dried to give 11.5 parts of a brown dye powder of the formula ric acid and 150 parts by volume of water, the solution is filtered, and 150 parts of ice and 30 parts by volume of 23% strength sodium nitrite solution are then added. After 1 hour at 0°-5° C., the excess nitrite is destroyed in the usual manner. A solution of 13.7 parts of 3-methoxy-4-methylaniline in 60 parts by volume of N,N-dimethylformamide is run into this diazonium salt solution, and saturated sodium acetate solution is then added dropwise until the pH reaches 4; during this operation, the temperature of the coupling mixture is kept at 0°-5° C. by continuously adding ice. The mixture is stirred overnight, after which it is heated to 75° C., and the precipitate is filtered off under suction, washed with water containing acetic acid and with hot water, and dried to give 25 parts of the coupling product of the formula

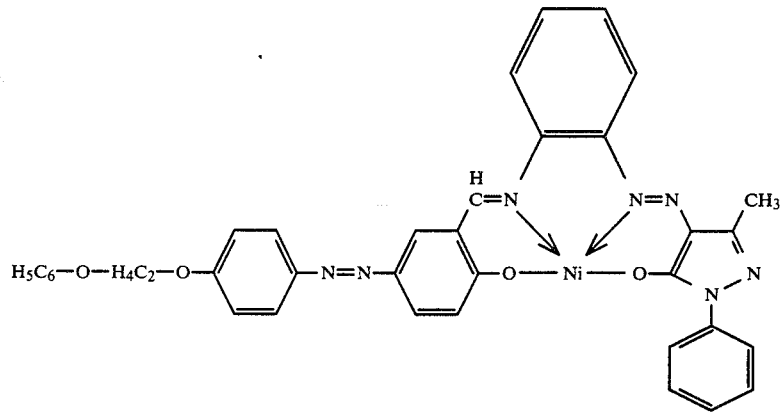

A fabric consisting of 65 parts of polyester fibers and 35 parts of mercerized cotton is impregnated with a liquor which contains 80 g/l of a 20% strength aqueous formulation of the above disperse dye and 80 g/l of a swelling agent and dye solvent consisting of 80 parts of a polyethylene glycol having a molecular weight of 1,500 and 20 parts of a reaction product of 1 mole of hexamethylenediamine and 15 moles of ethylene oxide.

The pH of the liquor is brought to 6 with citric acid. The impregnated fabric is dried for 60 seconds at 120° C., and then subjected to a temperature of 215° C. for a further 60 seconds in order to fix the dye. Thereafter, it is rinsed with cold water and with warm water, and washed at 100° C. for 20 minutes in the presence of a commercial detergent. The resulting brownish yellow dyeing possesses good lightfastness and fastness to washing and to crocking.

EXAMPLE 3

24.2 parts of 3-aminoindazole are dissolved in a mixture of 25 parts by volume of concentrated hydrochlo-

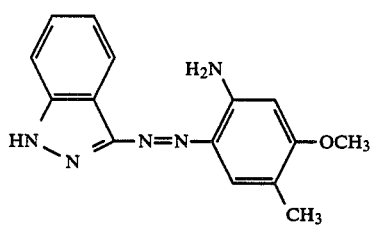

25.29 parts of this product, 21.6 parts of nickel(II) chloride hexahydrate and 20.34 parts of the product obtained when aniline is coupled to salicylaldehyde, in 300 parts by volume of N,N-dimethylformamide, are heated at 100° C. for 2 hours.

The mixture is then cooled, and the precipitate is filtered off under suction, washed with methanol and hot water, and dried to give a black dye powder of the formula

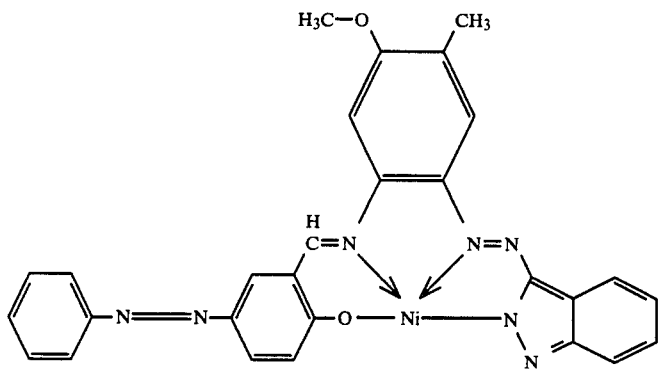

A fabric consisting of 65 parts of polyester fibers and 35 parts of mercerized cotton is impregnated with a liquor which contains 10 g/l of a 20% strength liquid formulation of the above disperse dye and 80 g/l of a swelling agent and dye solvent consisting of a mixture of 3 parts of polyethylene glycol having a molecular weight of 1,500 and 1 part of a reaction product of 1 mole of neopentanediamine and 15.6 moles of ethylene oxide. The pH of the padding liquor is brought to 6 with glutaric acid, and the fabric is padded with the liquor, the wet pickup being 45%. The fabric is then dried for 60 seconds at 120° C., and is fixed for 90 seconds at 225° C. in a continuous laboratory dryer. It is then rinsed with cold water and with warm water, and is washed for 5 minutes at 100° C. in the presence of a commercial detergent. The dye is virtually completely fixed on the fabric. The resulting olive dyeing is very lightfast and very fast to washing and to crocking.

EXAMPLE 4

145 parts of the product obtained when diazotized p-methoxy o-nitroaniline is coupled to 5-amino-1-furfuryl-pyrazole are hydrogenated with hydrogen at 60° C., in 1,000 parts by volume of N,N-dimethylformamide, in the presence of 15 parts of Raney nickel. The mixture is then filtered in order to remove the catalyst, the filtrate is poured into about 8,000 parts of ice water, and the precipitate is filtered off under suction, washed with water and dried to give the reduction product of the formula

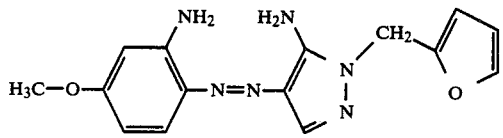

9.36 parts of the above product, 7.68 parts of the product obtained when diazotized o-anisidine is coupled to salicylaldehyde, and 7.2 parts of nickel(II) chloride hexahydrate in 100 parts by volume of N,N-dimethylformamide are stirred for 3 hours at 100° C. The mixture is then allowed to cool, and the crystal slurry is filtered off under suction. The crystals are washed with methanol and hot water, and dried to give the dye of the formula

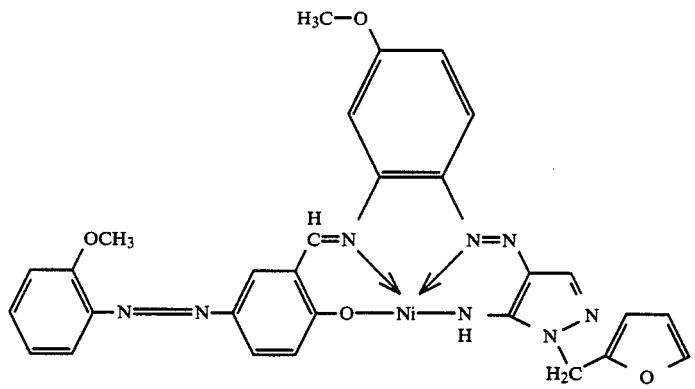

in the form of a brown powder.

A fabric consisting of 67 parts of polyester fibers and 33 parts of mercerized cotton is impregnated with a liquor which contains 100 g/l of a mixture of 80 parts of an ester of boric acid with polyethylene glycol (molecular weight about 800) in a molar ratio of 1:3 and 20 parts of the product obtained by reacting ethylenediamine with 35 moles of ethylene oxide. The wet pickup is 80%. Drying is then carried out for 15 minutes at 60°–70° C. The substrate is printed with the following printing paste:

500 parts of 10% strength aqueous starch ether thickener,
2 parts of citric acid,
10 parts of sodium m-nitrobenzenesulfonate,
50 parts of the above dye and
438 parts of water.

The print is dried for 2 minutes at 130° C., treated with hot air at 210° C. for 90 seconds and then rinsed.

The resulting yellowish brown print on a white ground possesses good lightfastness and good fastness to washing and to crocking.

EXAMPLE 5

85.2 parts of the product obtained when diazotized o-aminophenol is coupled to m-N,N-diethylaminoaniline, 81 parts of the product obtained when diazotized p-phenetidine is coupled to salicylaldehyde, and 72 parts of nickel(II) chloride hexahydrate in 1,000 parts by volume of N,N-di-methylformamide are stirred for 3 hours at 100° C. At 40° C., the precipitated crystals are filtered off under suction, washed with N,N-dimethylformamide, methanol and hot water, and dried to give 130 parts of a black powder of the formula

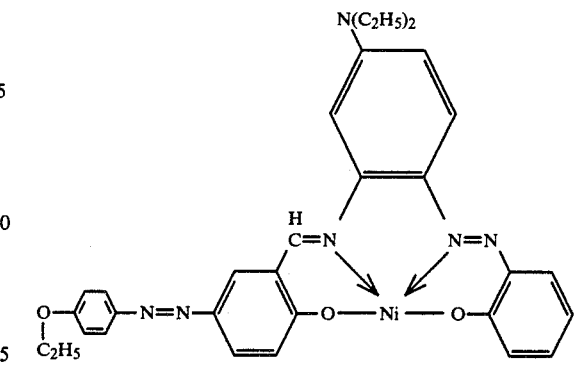

which dissolves in N-methylpyrrolid-2-one to give an olive green solution.

A 65:35 polyester/cotton blend is printed with a paste which consists of 20 parts of the above dye, 110 parts of polyethylene oxide having a molecular weight of 350, 30 parts of oleic acid diethanolamine and 840 parts of a 10% strength alginate thickener. The printed material is dried at 100° C. and then fixed with hot air at 190°–215° C. for 60 seconds. The print is then rinsed with cold water and with warm water, and is washed at 100° C. with a commercial detergent. The resulting olive green print on a white ground possesses good fastness properties.

The dyes below are obtained in a similar manner; they can be used to dye and print cotton and blends by the stated methods, and give dyeings possessing good fastness properties.

The dyes mentioned in the examples below can be converted to a commercial dye formulation as follows:
30 parts of dye,
6 parts of dispersant,
10 parts of a water-retaining agent,
1 part of disinfectant and
about 53 parts of water
are milled in a stirred ball mill until the particle size reaches about 0.5 μm. A dye dispersion having a long shelf life is obtained in this manner.

The substituents $T^1$, $T^2$, $T^3$, $T^4$, $T^5$, $T^6$, Me, $A^1$ and $A^2$ of the dyes listed in the table below, and the symbols above the columns of the table, correspond to the formula

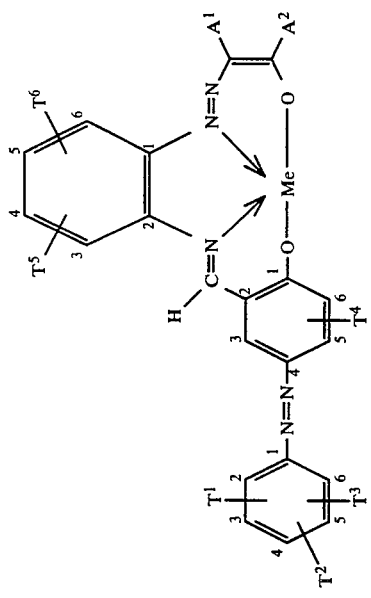
| Example | T¹ | T² | T³ | T⁴ | T⁵ | T⁶ | A¹ | A² | Me | Hue |
|---|---|---|---|---|---|---|---|---|---|---|
| 6 | 4-N=N-C₆H₄-OC₆H₅ | 2-OCH₃ | 5-OCH₃ | H | H | H | -C(=O)-NH-(1-naphthyl) | CH₃ | Ni | reddish brown |
| 7 | " | " | " | " | " | " | " | " | " | brown |
| 8 | H | H | H | " | " | " | " | " | " | " |
| 9 | " | " | " | " | 4-OCH₃ | " | -C(=O)-NH-C₆H₃(2-OCH₃)(4-OCH₃) | " | " | golden yellow |
| 10 | " | " | " | " | " | " | " | " | " | " |
| 11 | 4-N=N-C₆H₅ | " | " | " | H | " | -C(=O)-NH-C₆H₅ | " | " | yellowish brown |
| 12 | " | " | " | " | " | " | -C(=O)-N(C₂H₅)₂ | " | " | " |

-continued

| | | | | | | |
|---|---|---|---|---|---|---|
| 13 | " | " | " | " | $-\overset{O}{\underset{\|}{C}}-CH_3$ | " | " |
| 14 | " | " | " | " | $-\overset{O}{\underset{\|}{C}}-C_2H_5$ | " | " |
| 15 | " | " | " | " | $-\overset{O}{\underset{\|}{C}}-C_6H_5$ | " | " |
| 16 | " | " | " | " | $p\text{-}\overset{O}{\underset{\|}{C}}-C_6H_4-CH_3$ | " | " |
| 17 | " | " | " | " | $p\text{-}\overset{O}{\underset{\|}{C}}-C_6H_4-Cl$ | " | " |
| 18 | " | " | " | " | $-\overset{O}{\underset{\|}{C}}-CH_3$ | $C_2H_5$ | " |
| 19 | 2-OCH$_3$ | " | " | " | $-\overset{O}{\underset{\|}{C}}-NH-C_6H_5$ | $CH_3$ | golden yellow |
| 20 | 4-N=N-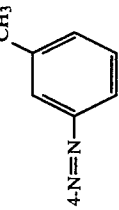 | 3-CH$_3$ | " | " | " | " | yellowish brown |
| 21 | " | " | " | " | $A^1, A^2:$ 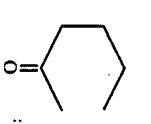 | " | " |
| 22 | " | H | " | " | $A^1, A^2:$ 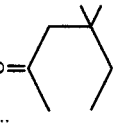 | " | " |
| 23 | 4-O-C$_6$H$_5$ | " | 4-NH$_2$ | " | $-\overset{O}{\underset{\|}{C}}-NHC_6H_5$  | $CH_3$ | orange |

-continued
| | | | |
|---|---|---|---|
| 24 | " | 4-OCH$_3$ | $-\underset{\underset{O}{\|\|}}{C}-NH-C_6H_5$ | " |
| 25 | 4-OC$_2$H$_4$OC$_6$H$_5$ | H | $-\underset{\underset{O}{\|\|}}{C}-NH-C_6H_4-2-CH_3$ | golden yellow |
| 26 | " | " | $-\underset{\underset{O}{\|\|}}{C}-NH-C_6H_4-2-C_2H_5$ | " |
| 27 | " | " | $-\underset{\underset{O}{\|\|}}{C}-NH-C_6H_4-2-OCH_3$ | " |
| 28 | " | " | $-\underset{\underset{O}{\|\|}}{C}-NH-C_6H_4-2-O-C_2H_5$ | " |
| 29 | " | " | $-\underset{\underset{O}{\|\|}}{C}-NH-C_6H_4-2-Cl$ | " |
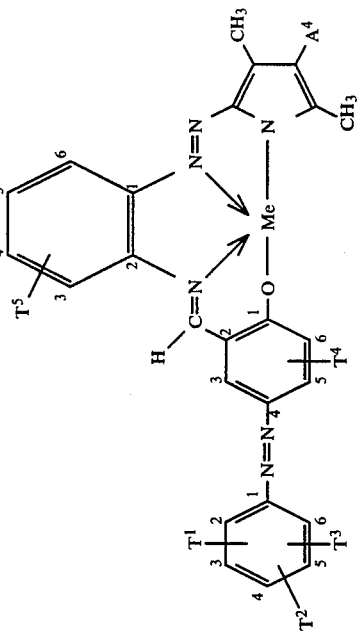
| Example | $T^1$ | $T^2$ | $T^3$ | $T^4$ | $T^5$ | $A^4$ | Me | Hue |
|---|---|---|---|---|---|---|---|---|
| 30 | " | " | " | " | " | " | " | " |
| 31 | 4-N=N-C$_6$H$_5$ | | | | | | | |

-continued
| 32 | 4-N=N-[pyridone-phenyl structure] | 2-OCH₃ | 5-CH₃ | | | | dull bluish red |
| 33 | 4-N=N-C₆H₅ | H | H | H | " | CO₂CH₃ | brown |
| 34 | " | " | " | " | " | CO₂C₂H₅ | " |
| 35 | " | " | " | 4-Cl | " | " | " |
| 36 | 2-OCH₃ | " | " | 4-OCH₃ | " | " | " |
| 37 | " | " | 6-OCH₃ | " | " | " | " |
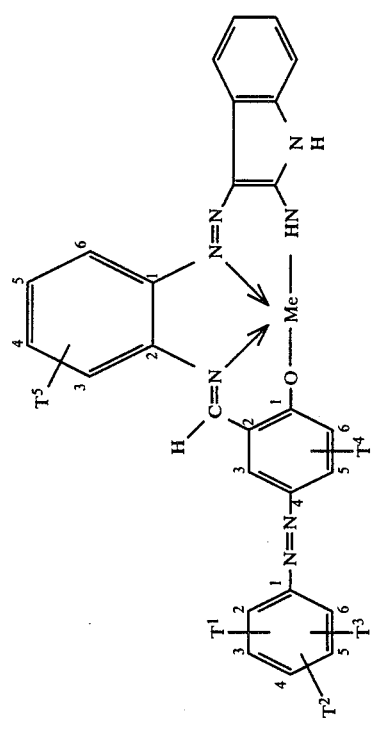
| Example | $T^1$ | $T^2$ | $T^3$ | $T^4$ | $T^5$ | Me | Hue |
|---|---|---|---|---|---|---|---|
| 38 | H | H | H | H | H | Ni | brown |
| 39 | " | " | " | " | 4-OCH₃ | " | dark brown |
| 40 | " | " | " | " | Cl | " | " |
| 41 | 2-OCH₃ | " | " | " | 4-OCH₃ | " | brown |
| 42 | 4-N=N-C₆H₅ | " | " | " | " | " | " |
| 43 | " | " | " | 6-OCH₃ | " | " | " |
| 44 | 2-Cl | " | " | " | H | " | " |

-continued
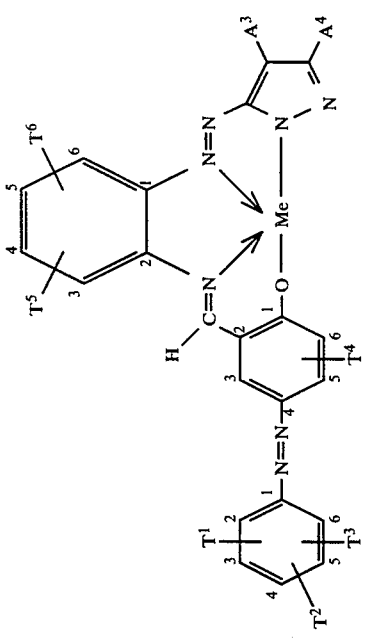
| Example | T¹ | T² | T³ | T⁴ | T⁵ | T⁶ | A³ | A⁴ | Me | Hue |
|---|---|---|---|---|---|---|---|---|---|---|
| 45 | H | H | H | H | 4-OCH₃ | 5-CH₃ | H | —C₆H₅ | Ni | yellowish olive |
| 46 | " | " | " | " | " | " | " | " | " | yellowish olive |
| 47 | 4-N=N—C₆H₅ | " | " | " | " | " | H | H | " | yellowish brown |
| 48 | 2-OCH₃ | " | " | " | " | " | " | " | " | yellowish olive |
| 49 | H | " | " | " | 4-N(C₂H₅)₂ | H | " | " | " | brown |
| 50 | 4-N=N—C₆H₅ | " | " | " | " | " | " | " | " | " |
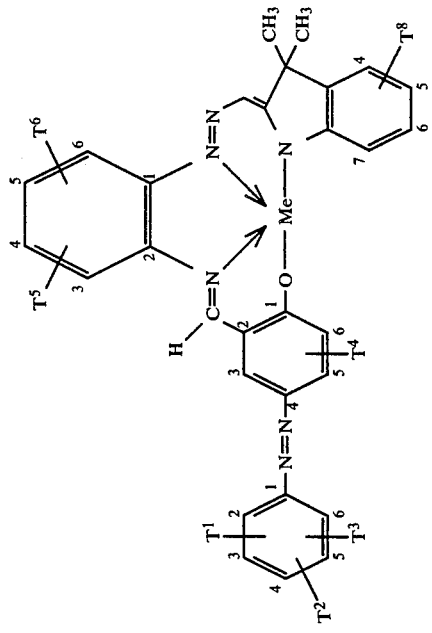

-continued

| Example | T¹ | T² | T³ | T⁴ | T⁵ | T⁶ | T⁸ | Me | Hue |
|---|---|---|---|---|---|---|---|---|---|
| 51 | H | H | H | H | 4-OCH₃ | H | H | Ni | brown |
| 52 | " | " | " | " | " | " | 5-Cl | " | " |
| 53 | 2-OCH₃ | " | " | " | " | " | H | " | " |
| 54 | " | " | " | " | " | " | 5-Cl | " | " |

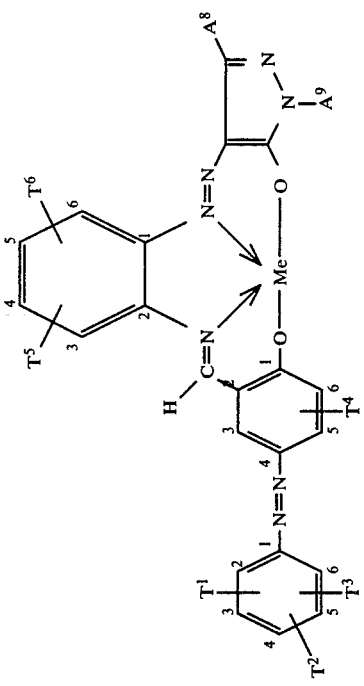

| Example | T¹ | T² | T³ | T⁴ | T⁵ | T⁶ | A⁸ | A⁹ | Me | Hue |
|---|---|---|---|---|---|---|---|---|---|---|
| 55 | H | H | H | H | 4-OCH₃ | H | CH₃ | —C₆H₄—2-C₂H₅ | Ni | pale brown |
| 56 | " | " | " | " | " | " | " | H | " | " |
| 57 | " | " | " | " | " | " | " | CH₃ | " | " |
| 58 | 4-N=N—C₆H₅ | " | " | " | " | " | " | C₆H₅ | " | " |
| 59 | " | " | " | " | " | " | " | —C₆H₃—2,5-Cl₂ | " | yellowish brown |
| 60 | " | " | " | " | " | " | C₆H₅ | H | " | " |
| 61 | " | " | " | " | " | " | CO₂CH₃ | C₆H₅ | " | " |
| 62 | " | " | " | " | " | " | CO₂C₂H₅ | " | " | " |
| 63 | " | " | " | " | " | " | CO₂C₃H₇ | " | " | " |
| 64 | " | " | " | " | " | " | CO₂C₄H₉ | " | " | " |
| 65 | " | " | " | " | " | " | CH₃ | " | " | " |
| 66 | " | " | " | " | " | 5-N=N—C₆H₅ | " | " | " | " |
| 67 | H | " | " | " | H | H | " | " | " | " |
| 68 | 4-N=N—C₆H₅ | 2-OCH₃ | 5-OCH₃ | " | 4-OCH₃ | " | " | " | " | reddish brown |
| 69 | 2-OCH₃ | H | H | 6-OCH₃ | " | " | " | " | " | yellowish brown |
| 70 | " | " | " | H | " | " | " | " | " | " |
| 71 | " | " | " | " | " | " | " | C₆H₄—2-CH₃ | " | " |
| 72 | " | " | " | " | " | " | " | C₆H₄—2-Cl | " | " |
| 73 | " | " | " | " | " | " | " | C₆H₄—3-Cl | " | " |
| 74 | " | " | " | " | " | " | " | C₆H₃—2-Cl—6-CH₃ | " | " |
| 75 | " | " | " | " | " | " | " | C₆H₄—4-Cl | " | " |
| 76 | " | " | " | " | " | " | " | C₆H₄—4-NO₂ | " | " |
| 77 | " | " | " | " | " | " | " | C₆H₄—4-CH₃ | " | " |

-continued

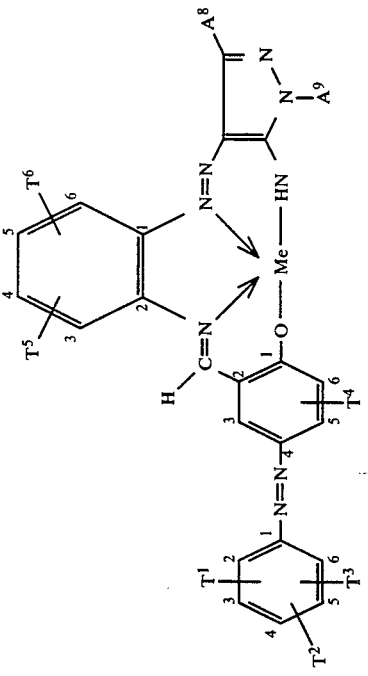

| Example | T¹ | T² | T³ | T⁴ | T⁵ | T⁶ | A⁸ | A⁹ | Me | Hue |
|---|---|---|---|---|---|---|---|---|---|---|
| 78 | H | H | H | H | 4-OC₆H₅ | H | H | —CH₂—⟨furyl⟩ | Ni | pale brown |
| 79 | 2-OCH₃ | 4-OCH₃ | 5-Cl | " | 4-OCH₃ | " | " | —CH₂C₆H₅ | " | yellowish brown |
| 80 | " | " | " | " | " | " | " | —CH₂CH(CH₃)₂ | " | " |
| 81 | " | " | " | " | " | " | " | —C₆H₁₁ | " | " |
| 82 | " | 5-OCH₃ | H | " | " | " | " | —CH₂—⟨furyl⟩ | " | brown |
| 83 | " | " | " | " | H | " | " | —CH₂C₆H₅ | " | " |
| 84 | " | " | " | " | " | " | " | —CH₂—⟨furyl⟩ | " | yellowish brown |
| 85 | " | " | " | " | " | " | " | —CH₂—⟨furyl⟩ | " | " |
| 86 | 2-Cl | " | " | " | 4-Cl | " | " | " | " | " |
| 87 | " | 6-Cl | " | " | 4-OCH₃ | " | " | " | " | " |
| 88 | 2-NO₂ | H | " | " | " | " | " | CH₂—C₆H₅ | " | " |
| 89 | " | " | " | " | " | " | " | " | " | " |
| 90 | " | " | " | " | " | " | " | —CH₂—⟨furyl⟩ | " | " |

-continued

| No. | R1 | R2 | R3 | R4 | Color |
|---|---|---|---|---|---|
| 91 | 2-OCH$_3$ | 5-CH$_3$ | " | —CH$_2$—C$_6$H$_5$ | brown |
| 92 | " | " | " | " | " |
| 93 | 4-N=N-C$_6$H$_4$-CH$_3$ (H$_3$C on 2-position) | 2-CH$_3$ | " | " | " |
| 94 | " | " | " | —CH$_2$-(2-furyl) | " |
| 95 | " | " | 4-Br | " | " |
| 96 | " | " | 4-OCH$_3$ | " | " |
| 97 | " | " | " | " | " |
| 98 | 2-OCH$_3$ | H | " | i-C$_3$H$_7$ | " |
| 99 | " | " | " | n-C$_3$H$_7$ | " |
| 100 | " | " | " | n-C$_4$H$_9$ | " |
| 101 | " | " | " | C$_2$H$_4$—OCH$_3$ | yellowish brown |
| 102 | " | " | " | C$_2$H$_4$OC$_6$H$_5$ | " |
| 103 | 4-OC$_6$H$_5$ | " | " | C$_6$H$_{11}$ | " |
| 104 | " | 4-CH$_3$ | " | —CH$_2$-(2-furyl) | brown |
| 105 | " | 3-CH$_3$ | " | CH$_2$—C$_6$H$_5$ | " |
| 106 | " | " | " | " | yellowish brown |
| 107 | " | " | 6-OCH$_3$ | CH$_2$-(2-furyl) | " |
| 108 | 4-OC$_2$H$_5$ | H | H | " | " |
| 109 | " | " | " | " | " |
| 110 | " | " | 4-OCH$_3$ | CH$_2$C$_6$H$_5$ | " |
| 111 | 4-OCH$_3$ | " | " | " | " |
| 112 | " | " | " | CH$_2$-(2-furyl) | " |
| 113 | 2-OCH$_3$ | " | " | CH$_2$—C$_6$H$_5$ | " |

-continued

| No. | | | | | 5-N=N-C₆H₅ | | |
|---|---|---|---|---|---|---|---|
| 114 | " | " | " | " | " | " | CH₂-furyl |
| 115 | " | " | " | 6-Br | " | H | " |
| 116 | " | " | " | 6-OCH₃ | " | " | " |
| 117 | " | " | " | H | " | CH₃ | H |
| 118 | " | " | " | " | " | C₆H₅ | " |
| 119 | " | " | " | 4-Cl | " | H | " |
| 120 | " | " | " | " | " | " | CH₂-furyl |
| 121 | " | " | " | 4-OC₂H₅ | " | " | " |
| 122 | " | " | " | 4-NH—CO—CH₃ | " | " | " |
| 123 | " | " | " | 4-OC₂H₅ | " | " | " |
| 124 | " | " | 2-Cl | 4-Br | " | " | " |
| 125 | " | " | " | 4-OCH₃ | " | " | " |
| 126 | " | " | " | " | " | " | " Co brown |
| 127 | " | " | " | " | " | " | " Mn pale brown |
| 128 | " | " | 4-CH₃ | " | " | " | " Zn " |
| 129 | " | " | " | " | " | " | " Cu " |
| 130 | " | " | 2-CH₃ | " | " | " | " Ni yellowish brown |
| 131 | " | " | " | " | " | " | CH₂C₆H₅ |
| 132 | " | " | 4-N (piperidone ring) | | " | " | CH₂-furyl |
| 133 | " | " | " | " | " | " | " |
| 134 | " | " | " | 4-OC₆H₅ | " | " | CH₂—C₆H₅ |
| 135 | " | " | 2-OC₂H₅ | 4-OCH₃ | " | " | CH₂—C₆H₅ |
| 136 | " | " | " | " | " | " | CH₂—C₆H₅ |
| 137 | " | " | H | 6-OCH₃ | " | " | " |

-continued

| No. | R¹ | R² | R³ | R⁴ | R⁵ | | Color |
|---|---|---|---|---|---|---|---|
| 138 | 4-N=N-[phenyl-N-piperidone] | | | | CH₂-furyl | " | brownish red |
| 139 | " | 2-OCH₃ | 5-OCH₃ | H | " | " | " |
| 140 | " | " | " | " | CH₂—C₆H₅ | " | " |
| 141 | " | " | " | 4-Cl | " | " | dull bluish red |
| 142 | " | H | H | 4-OCH₃ | " | " | " |
| 143 | 4-O—CH₂—C₆H₅ | " | " | " | CH₂—C₆H₅ | " | yellowish brown |
| 144 | " | 2-OCH₃ | 5-CH₃ | " | CH₂-furyl | " | brownish red |
| 145 | 4-N=N-[4-methoxyphenyl] | " | " | " | " | " | " |
| 146 | " | " | " | " | CH₂—C₆H₅ | " | " |
| 147 | 4-N=N—C₆H₅ | " | 5-OCH₃ | " | " | " | dullish bluish red |
| 148 | " | " | " | " | CH₂-furyl | " | reddish brown |
| 149 | " | " | " | " | CH₂—C₆H₅ | " | " |
| 150 | H | H | H | " | CH₂-furyl | " | pale brown |
| 151 | " | " | 6-Br | " | CH₂—C₆H₅ | " | yellowish brown |
| 152 | 4-Cl | " | H | " | CH₂-furyl | " | " |
| 153 | " | " | " | " | CH₂—C₆H₅ | " | " |
| 154 | 4-O—C₂H₄OC₆H₅ | " | " | " | CH₂-furyl | " | " |
| 155 | " | " | " | " | CH₂—C₆H₅ | " | " |

-continued
| | | | | | |
|---|---|---|---|---|---|
| 156 | 2-OCH₃ | " | " | CH₃ | H | pale brown |
| 157 | " | " | " | " | CH₂—C₆H₅ | " |
| 158 | " | " | " | " | CH₃ | " |
| 159 | " | " | " | " | C₂H₅ | " |
| 160 | 4-N=N—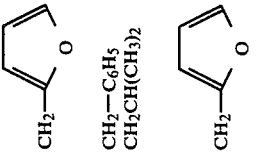 | 2-OCH₃ | 5-OCH₃ | " | C₆H₅ | brownish red |
| 161 | 4-N=N—C₆H₅ | H | H | H | CH₂— | brown |
| 162 | " | " | " | " | CH₂—C₆H₅ | " |
| 163 | " | " | " | " | CH₂CH(CH₃)₂ | " |
| 164 | 4-N=N—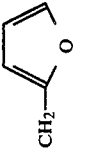 | 2-OCH₃ | 5-CH₃ | 4-OCH₃ | CH₂— | reddish brown |
| 165 | " | " | " | " | " | " |
| 166 | 2-CO—CH₃ | " | H | " | CH₂—C₆H₅ | " |
| 167 | " | " | " | " | " | brown |
| 168 | H | " | " | 4-SO₂N(C₂H₅)₂ | CH₂—C₆H₅ | pale brown |
| 169 | " | " | " | " | " | brown |
| 170 | " | " | " | 4-N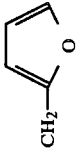 | CH₂— | " |

-continued

| No. | | | | | | | Color |
|---|---|---|---|---|---|---|---|
| 171 | | | | | 4-OCH₃ | CH₂—CH(CH₃)₂ | " |
| 172 | | | | | 4-Cl | CH₂-(furan) | " |
| 173 | | | | | 4-O—C₆H₅ | CH₃ | " |
| 174 | | | | | 4-O—C₂H₅ | H | " |
| 175 | | | | | " | —C₆H₅ —CH₂C₆H₅ | " |
| 176 | | | | | 4-OCH₃ | | yellowish brown |
| 177 | | | | | " | CH₂-(furan) | " |
| 178 | 2-Cl | | | | " | CH₂C₆H₅ | " |
| 179 | 2-O—C₂H₅ | | | | " | " | " |
| 180 | " | | | | " | CH₂-(furan) | " |
| 181 | 3-CH₃ | | | | " | " | " |
| 182 | " | | 3-CH₃ | | " | CH₂C₆H₅ | " |
| 183 | " | | | | " | " | brown |
| 184 | " | | 5-Cl | | " | CH₂C₆H₅ | " |
| 185 | 2-OCH₃ | | " | | " | " | " |
| 186 | 4-N=N-(3-CH₃-C₆H₄) | | " | | " | CH₂-(furan) | yellowish brown |
| 187 | " | | 5-O—C₂H₅ | | " | CH₂C₆H₅ | " |
| 188 | 2-O—C₂H₅ | | 4-CH₃ | | " | " | " |
| 189 | 2-CH₃ | | " | | " | CH₂-(furan) | " |
| 190 | " | | " | | " | " | " |
| 191 | 2-Br | | H | | " | " | " |
| 192 | 2-F | | " | | " | " | " |

-continued

| | | | | | | |
|---|---|---|---|---|---|---|
| 193 | 2-O—C$_3$H$_7$ | " | " | " | " | " brown |
| 194 | 2-O—C$_4$H$_9$ | " | " | " | " | " " |
| 195 | 4-C$_3$H$_7$ | " | " | " | " | " " |
| 196 | 4-C$_4$H$_9$ | " | " | " | " | " " |
| 197 | 4-C$_2$H$_5$ | " | " | " | " | " " |
| 198 | 4-NO$_2$ | " | " | " | " | " brown |
| 199 | 2-CF$_3$ | " | " | " | " | " yellowish brown |
| 200 | 2-CO—C$_{10}$H$_{21}$ (O=C) | " | " | " | " | " brown |
| 201 | 4-C(=O)—NH—CH$_2$—CH(C$_2$H$_5$)(C$_4$H$_9$) | " | " | " | " | " " |
| 202 | " | " | " | " | CH$_2$C$_6$H$_5$ | " " |
| 203 | " | " | " | " | " | " " |
| 204 | 4-C(=O)—N(C$_4$H$_9$)$_2$ | " | " | " |  | " " |
| 205 | 4-SO$_2$—CH$_3$ | " | " | " | " | " " |
| 206 | 4-SO$_2$—C$_4$H$_9$ | " | " | " | " | " " |
| 207 | 4-SO$_2$C$_2$H$_5$ | " | " | " | " | " " |
| 208 | 4-CO—CH$_3$ | " | " | " | " | " " |
| 209 | 4-CO$_2$—C$_2$H$_5$ | " | " | " | " | " " |
| 210 | 4-SO$_2$N(C$_2$H$_5$)$_2$ | " | " | " | " | " " |
| 211 | 4-N=N—C$_6$H$_4$—NO$_2$ | H | " | H | " | " dark brown |
| 212 | 4-N=N—C$_6$H$_4$—Cl (2-) | 2-OCH$_3$ | " | 5-CH$_3$ | " | " brownish red |
| 213 | " | " | " | " | CH$_2$—C$_6$H$_5$ | " " |
| 214 | 4-C(=O)—NH—C$_3$H$_6$OC$_2$H$_4$OC$_6$H$_5$ | H | " | H | " | " yellowish brown |

-continued

| No. | | | | | | | Color |
|---|---|---|---|---|---|---|---|
| 215 | " | " | " | " | " | CH₂-(2-furyl) | " |
| 216 | 4-C(=O)-N(C₂H₅)₂ | " | " | " | " | " | " |
| 217 | 4-C(=O)-N(CH₃)₂ | " | " | " | " | " | " |
| 218 | 4-SO₂-N(CH₃)₂ | " | " | " | " | " | " |
| 219 | 4-N=N-(2-Br-C₆H₄) | 2-OCH₃ | 5-CH₃ | " | " | " | brownish red |
| 220 | " | H | H | " | 5-NH-C(=O)-CH₃ | " | yellowish brown |
| 221 | " | " | " | " | 4-CH₃ | " | " |
| 222 | H | " | " | " | " | " | " |
| 223 | 2-OCH₃ | " | " | " | H | " | " |
| 224 | 2-CO₂CH₃ | " | " | " | 4-OCH₃ | CH₂CH(CH₃)₂ | " |
| 225 | 2-OCH₃ | 5-Cl | " | " | " | " | " |
| 226 | " | 4-OCH₃ | 5-Cl | " | " | " | " |
| 227 | " | " | " | " | H | CH₂-(2-furyl) | " |

-continued
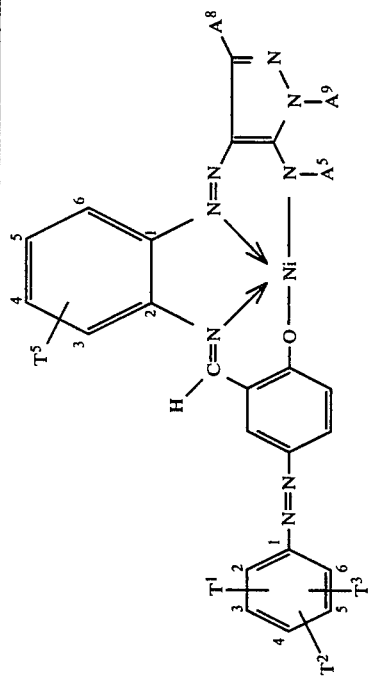
| Example | T¹ | T² | T³ | T⁵ | A⁵ | A⁸ | A⁹ | Hue |
|---|---|---|---|---|---|---|---|---|
| 228 | H | H | H | 4-OCH₃ | CH₃ | H | | yellowish brown |
| 229 | ″ | ″ | ″ | ″ | C₂H₅ | ″ | | ″ |
| 230 | ″ | ″ | ″ | ″ | n-C₄H₉ | ″ | | ″ |
| 231 | ″ | ″ | ″ | ″ | CH₂C₆H₅ | ″ | | ″ |
| 232 | ″ | ″ | ″ | ″ | n-C₄H₉ | ″ | CH₂C₆H₅ | ″ |
| 233 | 2-OCH₃ | ″ | ″ | ″ | ″ | ″ | ″ | ″ |
| 234 | 4-N=N—C₆H₅ | ″ | ″ | ″ | ″ | CH₃ | C₆H₅ | ″ |
| 235 | | | | | | | | |
| 236 | H | | | | | | | |
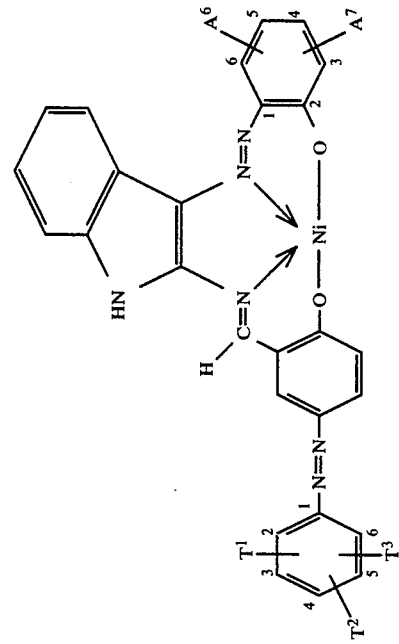

-continued

| Example | T¹ | T² | T³ | A⁶ | A⁷ | Hue |
|---|---|---|---|---|---|---|
| 237 | H | H | H | H | H | bluish gray |
| 238 | 2-OCH₃ | " | " | " | " | " |
| 239 | H | " | " | 4-NO₂ | 5-Cl | " |
| 240 | " | " | " | " | " | " |

[Structural formulas shown: a metal complex with two azo-linked phenyl/benzotriazole rings coordinated to Me via O and N; and a separate structure with a piperidone-substituted phenyl bearing 4-N=N— group]

| Example | T¹ | T² | T³ | T⁴ | T⁵ | T⁶ | T⁷ | Me | Hue |
|---|---|---|---|---|---|---|---|---|---|
| 241 | 4-N=N—C₆H₅ | H | H | H | 4-OCH₃ | 5-CH₃ | H | Ni | brown |
| 242 | H | " | " | " | " | " | " | Co | gray |
| 243 | " | 2-OCH₃ | 5-OCH₃ | " | " | " | " | Cu | " |
| 244 | 4-N=N—C₆H₅ (piperidone structure) | " | " | " | " | " | " | Ni | " |
| 245 | H | " | H | 6-Br | " | " | " | " | olive |
| 246 | " | " | " | 6-OCH₃ | " | " | " | " | " |
| 247 | " | " | " | H | 4-NH—COCH₃ | " | " | " | " |
| 248 | " | " | " | " | 4-O—C₂H₅ | " | " | " | " |
| 249 | " | " | " | " | 4-O—n-C₄H₉ | " | " | " | " |
| 250 | " | " | " | " | 4-O—n-C₃H₇ | " | " | " | " |
| 251 | " | " | " | " | 4-O—CH₂—C₆H₅ | " | " | " | " |
| 252 | " | " | " | " | 4-OCH₃ | H | " | " | " |
| 253 | " | " | " | " | " | Cl | " | " | " |
| 254 | 4-O—C₆H₅ | " | " | " | " | 5-CH₃ | 6-Cl | " | brownish olive |
| 255 | H | " | " | " | " | " | " | " | olive |
| 256 | " | " | " | " | " | " | 5-NO₂ | " | gray |

-continued

| Example | | | | | Hue |
|---|---|---|---|---|---|
| 257 | 4-N=N-[4-(2-oxopiperidin-1-yl)phenyl] | 2-OCH₃ | 5-CH₃ | H | brownish ruby |
| 258 | 2-CH₃ | H | H | " | olive |
| 259 | 4-N=N-(2-methylphenyl) | 2-CH₃ | " | " | gray |
| 260 | 4-N=N-(3-methylphenyl) | 3-CH₃ | " | " | dark brown |
| 261 | 4-C(CH₃)₃ | H | " | " | olive |
| 262 | 2-CO₂CH₃ | " | " | " | " |
| 263 | 2-OCH₃ | 4-OCH₃ | —5-Cl | " | " |
| 264 | 2-CH₃ | 4-CH₃ | H | " | " |
| 265 | 2-OCH₃ | 5-Cl | " | " | " |
| 266 | 2-Cl | H | " | " | " |
| 267 | 2-OCH₃ | 5-CH₃ | " | " | " |
| 268 | " | 5-OCH₃ | " | " | " |
| 269 | H | H | 4-OCH₃ | 5-OCH₃ | " |
| 270 | " | " | 4-OCH₃ | —O—CH₂—O— (4,5) | " |
| 271 | " | " | 4-OCH₃ | 5-CH₃ | " |
| 272 | 2-Br | " | " | H | " |

| Example | T¹ | T² | T³ | T⁴ | T⁵ | T⁶ | A⁶ | A⁷ | Hue |
|---|---|---|---|---|---|---|---|---|---|
| 273 | H | H | H | H | H | H | 4-N(C₂H₅)₂ | H | brownish red |
| 274 | " | " | " | " | " | " | 3-CH₃ | 5-CH₃ | olive |
| 275 | 4-N=N—C₆H₅ | " | " | " | 4-O—n-C₄H₉ | " | " | " | brown |
| 276 | H | " | " | " | " | " | H | H | olive |
| 277 | 2-OCH₃ | " | " | " | 4-OCH₃ | " | " | " | " |
| 278 | " | " | " | " | " | " | " | " | " |

A⁶: Zn, Ni values noted

-continued

| No. | | | | | | |
|-----|---|---|---|---|---|---|
| 279 | H | | | | (5,6-pentadienyl structure) | brownish olive |
| 280 | 2-OCH₃ | " | " | " | 5-CH₃ | olive |
| 281 | H | " | " | " | " | " |
| 282 | 2-OCH₃ | 4-OCH₃ | 6-OCH₃ | " | " | " |
| 283 | H | H | 5-Cl | " | " | brown |
| 284 | 2-OCH₃ | " | H | " | " | olive |
| 285 | 4-N=N-C₆H₅ | " | " | " | 5-OCH₃ | " |
| 286 | H | " | " | " | 5-Cl | " |
| 287 | " | " | " | " | " | " |
| 288 | " | " | " | 5-OCH₃ | 4-N(CH₂-CH=CH₂)(CH₂-CH₂-CN) | H | olive green |
| 289 | 4-O-C₆H₅ | " | " | H | 4-N(piperidinyl) | " | " |
| 290 | H | " | " | " | 4-N(C₂H₅)₂ | 4-NO₂ | green |
| 291 | 4-O-C₂H₅ | " | " | " | " | 5-Cl | " |
| 292 | " | " | " | " | " | H | " |
| 293 | 4-OCH₃ | " | " | " | " | " | " |
| 294 | 4-O-C₆H₅ | " | " | " | " | " | olive green |
| 295 | 4-N=N- (with 4-O-C₆H₅ group) | 2-OCH₃ | 5-OCH₃ | " | " | " | reddish brown |
| 296 | 4-O-C₆H₅ | " | " | " | " | 5-NO₂ | olive |
| 297 | " | " | " | " | " | 5-Cl | olive green |
| 298 | " | " | " | " | " | 5-SO₂N(CH₃)₂ | " |
| 299 | " | " | " | " | " | 5-CH₃ | " |
| 300 | " | H | H | 5-CH₃ | 4-NH-C₂H₅ | H | olive |
| 301 | 4-O-C₂H₅ | " | " | H | " | " | " |
| 302 | 2-OCH₃ | " | " | " | " | 3-CH₃ | olive |
| 303 | 2-Cl | " | " | " | " | 5-CH₃ | " |
| 304 | 4-N=N-C₆H₅ | " | " | " | " | H | brown |
| 305 | " | " | " | " | " | 5-C₂H₅ | " |
| 306 | " | " | " | " | " | 5-C(CH₃)₃ | olive |
| 307 | " | " | " | " | " | 5-C₆H₅ | " |
| 308 | " | " | " | " | " | 5-OCH₃ | " |
| 309 | H | " | " | " | " | 5-O-C₆H₅ | olive |

-continued
| | | | | | |
|---|---|---|---|---|---|
| 310 | " | " | " | 5-OCH$_3$ | " |
| 311 | " | " | " | 5-C$_6$H$_5$ | " |
| 312 | " | " | " | 5-C(CH$_3$)$_2$ | " |
| 313 | " | " | " | 4-N(C$_2$H$_5$)$_2$ | " |
| 314 | " | " | " | 4-N(CH$_3$)$_2$ | " |
| 315 | 4-N=N—C$_6$H$_5$ | " | " | 4-N(C$_2$H$_5$)$_2$ | dull bluish red |
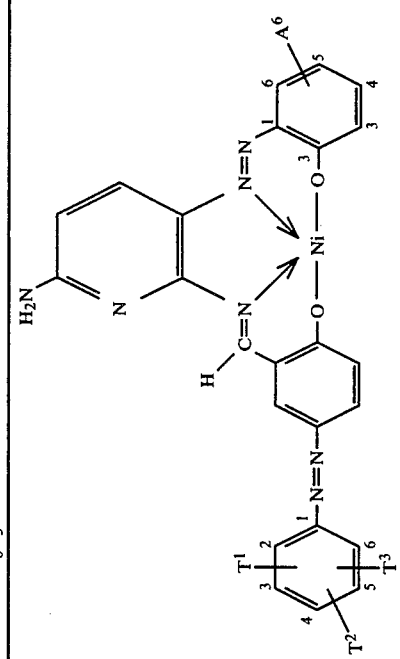
| Example | T$^1$ | T$^2$ | T$^3$ | A$^6$ | Hue |
|---|---|---|---|---|---|
| 316 | 4-O—C$_6$H$_5$ | H | H | H | olive |
| 317 | 4-N=N—C$_6$H$_5$ | " | " | " | gray |
| 318 | —OCH$_3$ | " | " | " | olive |
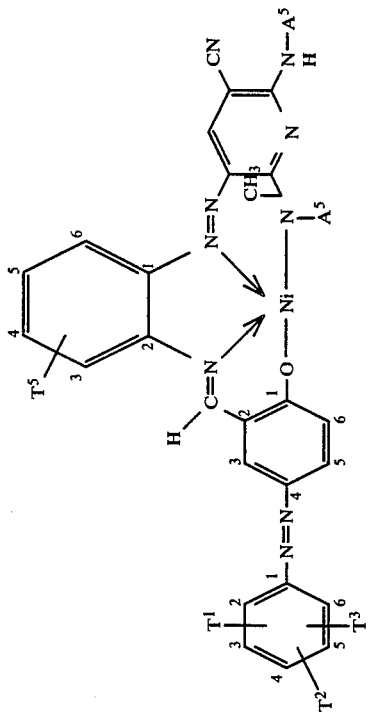
| Example | T$^1$ | T$^2$ | T$^3$ | T$^5$ | A$^5$ | Hue |
|---|---|---|---|---|---|---|
| 319 | H | H | H | H | —(CH$_2$)$_3$OCH$_3$ | brown |
| 320 | " | " | " | " | —(CH$_2$)$_2$OCH$_3$ | " |

-continued
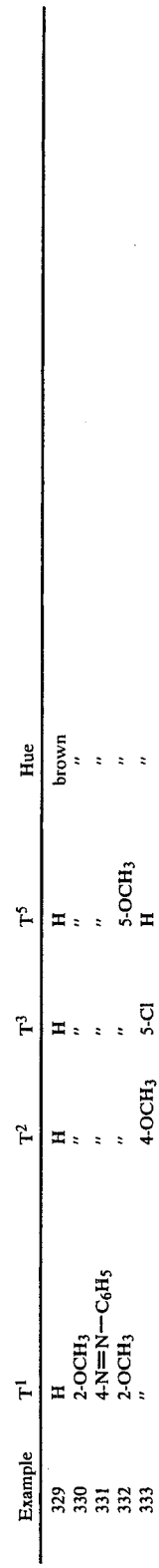
| Example | T¹ | | | | | |
|---|---|---|---|---|---|---|
| 321 | " | " | 5-OCH₃ | —(CH₂)₃OCH₃ | | |
| 322 | " | " | 5-Cl | " | | |
| 323 | 4-N=N—C₆H₅ | " | H | " | | |
| 324 | 2-OCH₃ | 4-OCH₃ | " | " | | |
| 325 | " | H | 5-Cl | " | | |
| 326 | " | " | H | " | | |
| 327 | " | " | " | " | | |
| 328 | " | " | " | —C₂H₅ | | |
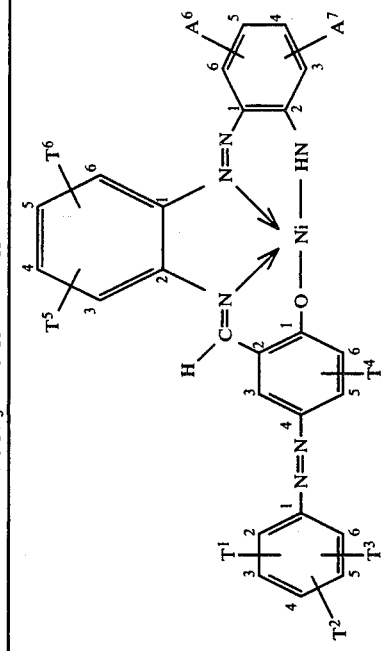
| Example | T¹ | T² | T³ | T⁵ | Hue |
|---|---|---|---|---|---|
| 329 | H | H | H | H | brown |
| 330 | 2-OCH₃ | " | " | " | " |
| 331 | 4-N=N—C₆H₅ | " | " | 5-OCH₃ | " |
| 332 | 2-OCH₃ | " | 5-Cl | H | |
| 333 | " | 4-OCH₃ | | | |

-continued

| Example | T¹ | T² | T³ | T⁴ | T⁵ | T⁶ | A⁶ | A⁷ | Hue |
|---|---|---|---|---|---|---|---|---|---|
| 334 | H | H | H | H | H | H | 5,6 | (CH₂CH=CHCH₂CH=CHCH₂-) | olive |
| 335 | 2-OCH₃ | " | " | " | " | " | " | " | " |
| 336 | 4-N=N—C₆H₅ | " | " | " | " | " | " | " | olive brown |
| 337 | " | " | " | " | 4-OCH₃ | 5-CH₃ | " | " | brown |
| 338 | H | " | " | " | " | " | " | H | " |
| 339 | 4-N=N-(4-(2-oxopiperidin-1-yl)phenyl) | 2-OCH₃ | 5-CH₃ | " | " | " | " | " | " |
| 340 | " | " | 5-OCH₃ | " | " | " | " | " | reddish brown |

We claim:
1. A compound of the formula I

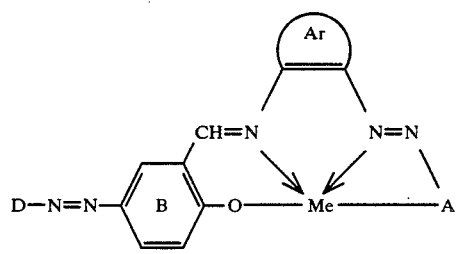

wherein
A is a radical of a coupling or diazo component selected from the group consisting of

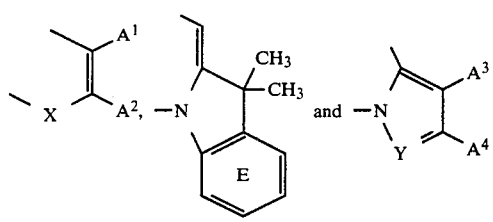

wherein
$A^1$ is $(C_2-C_3)$alkanoyl, benzoyl, $(C_2)$alkylaminocarbonyl or phenylaminocarbonyl, which are substituted by $H_1$, $CH_3$, Cl or $OCH_3$, $A^2$ is $(C_1-C_2)$alkyl or phenyl, or $A^1$ and $A^2$ together form an aliphatic, aromatic or heterocyclic ring selected from the group consisting of

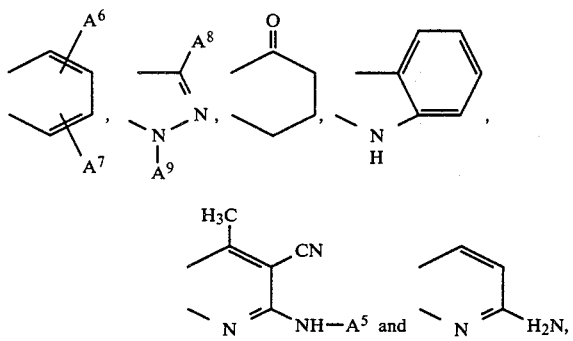

wherein
$A^5$ is hydrogen, $(C_1-C_4)$alkyl, $\beta$-methoxyethyl, $\gamma$-methoxypropyl or benzyl;
$A^6$ is hydrogen, $(C_1-C_2)$alkyl, chlorine, bromine, nitro or phenylazo substituted by H, chlorine, bromine, methyl, methoxy, nitro or cyano, $A^7$ is hydrogen, chlorine or methyl, or
$A^6$ and $A^7$ together complete a benzo ring;
$A^8$ is hydrogen, methyl, phenyl or $(C_1-C_4)$alkoxycarbonyl;
$A^9$ is hydrogen, $(C_1-C_4)$alkyl, $(C_1-C_4)$cycloalkyl, $(C_5-C_8)$aralkyl, $(C_5-C_8)$heteroaralkyl or phenyl, which are substituted by H, $(C_1-C_2)$alkoxy, Cl, $NO_2$, Br or $CH_3$;

$A^3$ is hydrogen or $(C_1-C_2)$alkyl, $A^4$ is hydrogen, $(C_1-C_4)$alkoxycarbonyl, $(C_1-C_2)$alkyl or phenyl, or
$A^3$ and $A^4$ together form tetramethylene or complete a benzo ring substituted by H, Cl or $NO_2$;
X is —O— or
Y is —N= or
the ring E is substituted by H or chlorine;
Ar is an aromatic or heterocyclic radical selected from the group consisting of

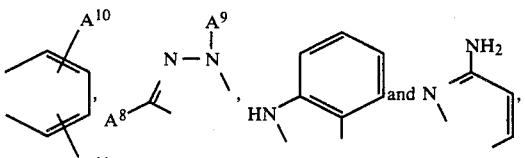

wherein
$A^{10}$ is hydrogen, chlorine, bromine, $(C_1-C_2)$alkyl, $(C_1-C_4)$alkoxy, phenylazo, mono- or di-$(C_1-C_4)$amino which is substituted by H, —$OCH_3$ or Cl, —$OC_6H_5$, —$OCH_2C_6H_5$, —$OC_2H_4OC_6H_5$,

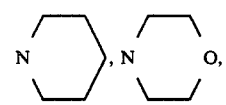

$NHCOCH_3$, $NHCOC_2H_5$,

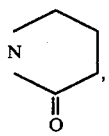

$N(CH_3)C_2H_4CN$, $N(C_2H_5)C_2H_4CN$, or $N(CH_2CH=CH_2)C_2H_4CN$, $A^{11}$ is hydrogen, methyl, or chlorine, or
$A^{10}$ and $A^{11}$ together complete a benzo ring;
D is a radical of a diazo component;
Me is a $Co^{2+}$, $Cu^{2+}$, $Zn^{2+}$, $Mn^{2+}$ or $Ni^{2+}$ ion; and
the ring B is substituted by H, $(C_1-C_4)$alkyl, $(C_1-C_2)$alkoxyl, chlorine or bromine.
2. A compound as claimed in claim 1, of the formula

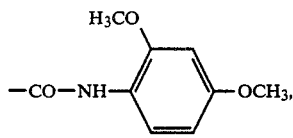

where $B^1$ is hydrogen, methyl or phenyl, $B^1$ and $B^2$ together complete an unsubstituted or substituted benzo ring, $B^3$ is methyl, alkoxy or benzyloxy, $B^4$ is hydrogen, methyl, chlorine or methoxy and $D^1$ is phenyl which is unsubstituted or substituted by chlorine, bromine, cyano, trifluoromethyl, $C_1-C_4$-alkoxycarbonyl, alkyl, alkoxy, phenoxy, substituted alkoxy or unsubstituted or substituted phenylazo.

3. A compound as claimed in claim 2, wherein, in the formula, $B^1$ and $B^2$ complete a benzo ring which is unsubstituted or substituted by methyl or chlorine, $B^3$ is methyl, $C_1-C_4$-alkoxy or benzyloxy, $B^3$ and $B^4$ together form a radical of the formula $$-O-CH_2-O-$$

$D^1$ is phenyl which is unsubstituted or substituted by chlorine, bromine, cyano, trifluoromethyl, $C_1-C_4$-alkoxycarbonyl, methyl, ethyl, propyl, butyl, $C_1-C_4$-alkoxy, phenoxy or benzyloxy or by phenylazo which is unsubstituted or substituted by chlorine, bromine, methyl, ethyl or $C_1-C_4$-alkoxy, and $B^1$ and $B^4$ have the stated meanings.

4. A compound as claimed in claim 1, of the formula

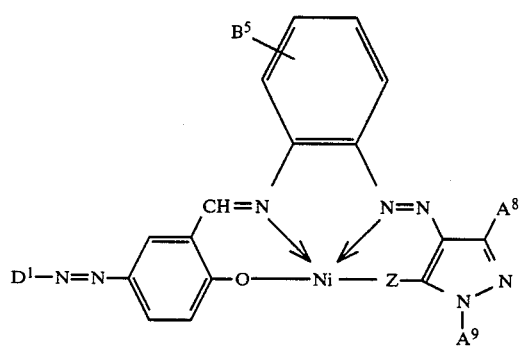

Ib where $A^8$ is hydrogen, methyl, phenyl or $C_1-C_4$-alkoxycarbonyl, $A^9$ is hydrogen or unsubstituted or substituted alkyl, cycloalkyl, aralkyl, heteroaralkyl, or aryl, $B^5$ is hydrogen, methyl, ethyl, methoxy, ethoxy, phenoxy, acetylamino or chlorine, Z is $-O-$ or $-NH-$ and $D^1$ has the meanings stated for claim 2.

5. A compound as claimed in claim 4, wherein, in the formula, $D^1$ is phenyl which is unsubstituted or substituted by chlorine, bromine, cyano, trifluoromethyl, $C_1-C_4$-alkoxycarbonyl, methyl, ethyl, propyl, butyl, $C_1-C_4$-alkoxy, phenoxy or benzyloxy or by phenylazo which is unsubstituted or substituted by chlorine, bromine, methyl, ethyl or $C_1-C_4$-alkoxy, and $A^9$ is hydrogen, $C_1-C_6$-alkyl, cyclohexyl, methylcyclohexyl, benzyl, furylmethyl or phenyl which is unsubstituted or substituted by chlorine, bromine, methyl, ethyl, methoxy or ethoxy, and $A^8$, $B^5$ and Z have the meanings stated for claim 4.

6. A compound as claimed in claim 1, of the formula

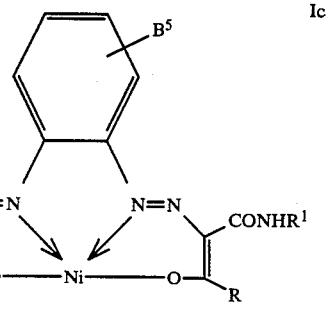

Ic where R is methyl or phenyl, $R^1$ is naphthyl or phenyl which is unsubstituted or substituted by $CH_3$, $C_2H_5$, $OCH_3$, $OC_2H_5$ or Cl, and $B^5$ and $D^1$ have the stated meanings.

7. A compound as claimed in claim 6, wherein, in the formula, $D^1$ is phenyl which is unsubstituted or substituted by chlorine, bromine, cyano, trifluoromethyl, $C_1-C_4$-alkoxycarbonyl, methyl, ethyl, propyl, butyl, $C_1-C_4$-alkoxy, phenoxy or benzyloxy or by phenylazo which is unsubstituted or substituted by chlorine, bromine, methyl, ethyl or $C_1-C_4$-alkoxy, and $B^5$, R and $R^1$ have the meanings stated for claim 6.

* * * * *